United States Patent [19]
Barie, Jr. et al.

[11] 4,101,516
[45] Jul. 18, 1978

[54] CLEAR AND COLORLESS EPOXIDE DIANHYDRIDE CURED RESINS

[75] Inventors: Walter P. Barie, Jr., Shaler Township, Allegheny County; James T. Eurich, Winfield Township, Butler County, both of Pa.

[73] Assignee: Gulf Research & Development Company, Pittsburgh, Pa.

[21] Appl. No.: 749,251

[22] Filed: Dec. 10, 1976

[51] Int. Cl.$^2$ ............................................. C08G 59/42
[52] U.S. Cl. ................................. 528/112; 260/830 R; 260/365
[58] Field of Search .......... 260/47 EA, 2 EA, 47 EC, 260/2 EC, 78.41

[56] References Cited

U.S. PATENT DOCUMENTS

| | | | |
|---|---|---|---|
| 2,965,610 | 12/1960 | Newey | 260/47 |
| 2,989,500 | 6/1961 | Bavley et al. | 260/47 |
| 3,297,723 | 1/1967 | Selwitz | 260/347.3 |
| 3,556,920 | 1/1971 | Balme et al. | 161/185 |
| 3,842,035 | 10/1974 | Klaren | 260/47 EN |

*Primary Examiner*—Harold D. Anderson
*Assistant Examiner*—E. A. Nielsen

[57] ABSTRACT

A clear, colorless cured resin is prepared from a solid epoxy resin and 5-phenyl-5-methylhexane-1,2,3,4-tetracarboxylic acid dianhydride.

11 Claims, No Drawings

CLEAR AND COLORLESS EPOXIDE DIANHYDRIDE CURED RESINS

FIELD OF THE INVENTION

This invention relates to the preparation of clear, colorless resins by curing a solid epoxy resin with 5-phenyl-5-methylhexane-1,2,3,4-tetracarboxylic acid dianhydride.

DESCRIPTION OF THE PRIOR ART

U.S. Pat. No. 3,297,723 describes the preparation of novel tetracarboxylic acid dianhydrides, including 5-phenyl-5-methylhexane-1,2,3,4-tetracarboxylic acid dianhydride and suggests that these dianhydrides be used to cure epoxy resins at an A/E ratio of 0.1 to 0.9. Cured resins made in accordance with this patent are generally clear but strongly colored, particularly brown colored.

SUMMARY OF THE INVENTION

We have surprisingly discovered that a powdered mixture of a solid epoxy resin and 5-phenyl-5-methylhexane-1,2,3,4-tetracarboxylic acid dianhydride having an A/E ratio of 1.0 to about 1.5 cures to a clear, hard resin that is colorless to substantially colorless depending upon the thickness of the resin. This formulation is particularly useful in the production of colorless coatings and substantially colorless molded products.

Epoxy resin systems are frequently preferred for coating applications for a variety of reasons including the fact that epoxy resin systems have good adhesion to a substrate, good chemical and solvent resistance, good mechanical properties and the like. But cured epoxy resins are generally strongly colored from yellow to dark brown and are not therefore useful in applications requiring a color-free material. For example, epoxy resins cured with amine cross-linking agents are generally yellow to brown in color. Since the monoanhydride cross-linking agents generally require a tertiary amine accelerator, their use generally results in yellow to brown colored resin products. Although the dianhydride curing agents can frequently be used without an accelerator because the dianhydrides are more highly reactive than the monoanhydrides, the resins cured with dianhydrides are strongly yellow, although clear. This includes such dianhydrides as pyromellitic dianhydride, cyclopentane dianhydride and 3,3',4,4'-benzophenone tetracarboxylic acid dianhydride. We have further found that when an epoxy resin is cross-linked with 5-phenyl-5-methylhexane-1,2,3,4-tetracarboxylic acid dianhydride at an A/E ratio of 0.1 to 0.9 as described in U.S. Pat. No. 3,297,723, the resulting product is clear, but strongly brown in color.

Unexpectedly, we have discovered that 5-phenyl-5-methylhexane-1,2,3,4-tetracarboxylic acid dianhydride can be formulated into a powder with a solid epoxy resin at a surprisingly high A/E ratio of 1.0 to about 1.5 and that the resulting cured resin is clear and colorless, particularly when used in coating applications. This powder formulation can be applied to a substrate in coating applications such as by electrostatic application, fluidized bed techniques and the like. The resulting cured coating as prepared with our formulation and using our techniques is clear and colorless. This cured resin is tightly adherent to the substrate, possesses good chemical and solvent resistance and good electrical properties as represented by dielectric constant and dissipation factor. The coating prepared from our formulation also possessed good flexibility as determined by the conical mandrel test apparatus. The powder formulation can also be used in powder molding applications including transfer, injection and compression molding techniques.

The epoxy resins which we use in preparing our powder formulations are solid at room temperature (20°-25° C.). They can have an epoxy equivalent weight of between about 400 and 4,000, preferably between about 500 and about 2,500. They are further characterized as having a Durran melting point of between about 50° C. and about 150° C., preferably between about 65° C. and about 100° C. These epoxy resins have a 1,2-epoxy equivalent value greater than 1, preferably at least about 2.

A typical epoxy resin is obtained by the reaction of epichlorohydrin with bisphenol A. This is a complex mixture which has an average epoxy equivalent value of about 2. Suitable solid epoxy resins can also be obtained by the reaction of epichlorohydrin with other dihydric phenols, such as resorcinol. Other suitable solid epoxy resins are the epoxy novolac resins which are obtained by the reaction of epichlorohydrin with phenol-formaldehyde or cresol-formaldehyde resins containing reactive-OH groups. Also useful are the solid cycloaliphatic or peracetic resins prepared by epoxidizing dicyclohexene ester derivatives with peracetic acid.

The solid dianhydride cross-linking agent in our formulation, 5-phenyl-5-methylhexane-1,2,3,4-tetracarboxylic acid dianhydride can be prepared by the controlled reaction of cumene with maleic anhydride as described in U.S. Pat. No. 3,297,723. Although this dianhydride is more reactive than most monoanhydrides, we find it desirable to use an accelerator in the formulation in order to better control the cure rate and time. We prefer to use tin octanoate or zinc acetylacetonate as the accelerator in the formulation.

The various compositions within our broad formulation can be cured at a temperature between about 140°-190° C., but we prefer a curing temperature between about 150° and about 180° C. Ten minutes to 1 hour is a suitable length of time to accomplish the curing, but we prefer to carry out the curing in about 20 to 45 minutes. The molding pressure can broadly be between about 50 to about 5,000 psi and preferably between about 100-750 psi.

Both the epoxy resin and the dianhydride are white solids, which can readily be broken down into a fine, free-flowing powder in a ball or pebble mill. The liquid accelerator, when used, is preferably charged to the mill together with the dianhydride and the epoxy resin and is thoroughly and intimately incorporated throughout the powder by the grinding operation. The fineness of the powder is dependent, in part, on the length of time that the grinding is conducted. The finer the powder, the more intimately and thoroughly are the two powders intermixed, which results in a more uniform polymerization and a more homogeneous product. Therefore, we prefer that the powder be of a particle size such that substantially 100 percent will pass through a 50 mesh sieve.

The expression A/E ratio is conventionally used in the epoxy resin art and is used herein to indicate the ratio of total anhydride equivalents to total epoxy equivalents in an uncured resin formulation. As stated, the cured resin prepared in accordance with this invention from a solid epoxy resin and 5-phenyl-5-methylhexane-1,2,3,4-tetracarboxylic acid dianhydride at an A/E ratio of 1.0 to about 1.5 is colorless or substantially colorless. We have found that films or coatings are colorless when viewed under proper lighting while a thicker sample resulting from molding the powdered resin tends to have a slight, barely perceptible yellowish tint.

In the following experiments PMTD is used to represent 5-phenyl-5-methylhexane-1,2,3,4-tetracarboxylic acid dianhydride. Epon is a trademark of Shell Chemical Company for epoxy resins, DER is the trademark of Dow Chemical Company for epoxy resins, and ERL is the trademark of Union Carbide Plastics Division for epoxy resins. Epon 828 is a liquid diglycidyl ether of bisphenol A having an epoxy equivalent weight of about 190. Epon 1004 is a solid diglycidyl ether of bisphenol A having an epoxy equivalent weight of about 875 to 1025 and a Durran melting point of 95°–105° C. DER 661 is a solid diglycidyl ether of bisphenol A having an epoxy equivalent weight of about 475–575 and a Durran melting point of 70°–80° C. ERL-4221 is liquid 3,4-epoxycyclohexylmethyl-3,4-epoxycyclohexane carboxylate having an epoxy equivalent weight of 133. Ceramic grinding media sold by Fisher Scientific Company, Pittsburgh, Pa., consisting of 13/16-inch by 13/16-inch cylinders were used. The films made in the following experiments were in the range of 1 to 5 mils in thickness and the moldings were disks about 2 inches in diameter and between about 1/16 to ⅛-inch thick.

EXAMPLE 1

In a typical preparation of a powder, 90.0 g. (0.1 epoxy equivalents) of Epon 1004, 15.8 g. (0.1 anhydride equivalents) of PMTD, 0.9 g. (one part per hundred parts of resin) of tin octanoate and 600 g. of the ceramic grinding cylinders are charged to a 0.3 gallon porcelain jar. The porcelain jar is rolled on a roller mill for 16 to 24 hours at 160–320 revolutions per minute. A typical sieve analysis of powder after 24 hours of grinding is 100 percent through 50 mesh, 98.8 percent through 100 mesh and 93.2 percent through 200 mesh.

EXAMPLE 2

A powder having an A/E ratio of 1.25 was made from 90.0 g. of Epon 1004, 19.75 g. of PMTD and 0.9 g. of tin octanoate by grinding overnight in the manner described in the preceding example. The powder was molded into a disk at a temperature of 165° C. and at a pressure of 500 psi. for 30 minutes. Upon cooling to room temperature, it had a Barcol hardness of 28 and was excellent in quality, being clear, haze-free and substantially colorless.

EXAMPLE 3

Another powder was prepared and a portion was cured in a mold as in the above example except that 15.8 g. of PMTD were used to give an A/E ratio of 1.0. This product also had a Barcol hardness of 28 and was also clear and haze-free and substantially colorless.

EXAMPLE 4

A further powder was prepared and cured as in Example 2 except that 23.7 g. of PMTD were used to give an A/E ratio of 1.5. This product exhibited a Barcol hardness of 35 and was also clear and haze-free and substantially colorless.

EXAMPLE 5

A powder was prepared as in Example 1 using 90 g. of DER 661, 20.3 g. of PMTD and 0.9 g. (one phr.) of tin octanoate to give an A/E ratio of 0.75. The powder was molded at 165° C. and 500 psi for 30 minutes and cured to a cloudy, opaque product.

EXAMPLE 6

A liquid-solid mixture of 40 g. of ERL-4221, 46.2 g. of PMTD (A/E ratio of 1.0) and 0.4 g. of tin octanoate was prepared in a 3-roll mill. This mixture was cured at 165° C. to a cloudy product.

EXAMPLE 7

Example 6 was repeated except that the A/E ratio was reduced to 0.5. This liquid-solid mixture also cured at 165° C. to a cloudy product.

EXAMPLE 8

A liquid mixture of 20.0 g. of Epon 828 containing 11.8 g. of PMTD (A/E ratio of 0.75) but no accelerator was heated to 190° C. with mixing and turned brown. The mixture was cured overnight at 110° C. and a significant amount of PMTD had precipitated from the resin.

EXAMPLE 9

A portion of the powder prepared in Example 3 was applied to a cold rolled steel test panel preheated to 165°–170° C. This test panel was 3 inches wide, 6 inches long and 0.032 inches thick (S-36 panel obtained from the Q-Panel Co., Cleveland, Ohio). The resin cured for ½ hour at 165° C. to a uniform, clear and colorless coating. The flexibility and adherency of this coating was determined with a conical mandrel apparatus in accordance with ASTM D-522-60. The coating showed no loss of adhesion when bent greater than 180° on a ⅛-inch mandrel.

EXAMPLE 10

A powder resin composition was made from PMTD and Epon 1004 in an A/E ratio of 1.25 in the manner as described in Example 1. A portion of this powder was applied to a metal test panel as described in the preceding example at room temperature and was cured at 175° C. for 1 hour. A second portion was applied to a second S-36 metal test panel preheated to 165°–170° C. and was cured at 165° C. for ½ hour. Both cured to a clear, colorless coating which showed no loss of adhesion after being bent more than 180° when tested on the ⅛ inch mandrel.

EXAMPLE 11

Another powder resin having an A/E ratio of 1.50 was prepared by the method described in Example 1 from PMTD and Epon 1004. A portion of the powder was applied to a test strip at room temperature and was cured for ½ hour at 165° C. to a uniformly clear and colorless coating. When tested by being bent more than 180° on the ⅛ mandrel, it showed no loss of adhesion.

EXAMPLE 12

The electrical properties of three formulations of PMTD and Epon 1004 having an A/E ratio of 1.0, 1.25 and 1.5 were investigated. Each of these powder formulations was prepared as in Example 1 and was mold cured to substantially colorless, circular disks as in Example 2. The dielectric constant and dissipation factor was determined by ASTM D-150 at 60 hertz, 1 kilohertz and 1 megahertz. The dielectric constant for each of the three disks at each of the three frequencies was in the range of between 3.5 and 3.9. The dissipation factor for each of the three disks at each of these three frequencies was in the range of between 0.003 and 0.008. Other tests demonstrated that these cured resin formulations possess good chemical and solvent resistance.

It is to be understood that the above disclosure is by way of specific example and that numerous modifications and variations are available to those of ordinary skill in the art without departing from the true spirit and scope of the invention.

We claim:

1. A powdered resin mixture which will cure to a clear, substantially colorless hard resin comprising 5-phenyl-5-methylhexane-1,2,3,4-tetracarboxylic acid dianhydride and an epoxy resin having an epoxy equivalent value greater than one and an epoxy equivalent weight between about 400 and about 4,000, and a ratio of anhydride equivalents to epoxy equivalents of between 1.0 and about 1.5.

2. A powdered resin mixture in accordance with claim 1 in which the epoxy equivalent weight is between about 500 and about 2,500.

3. A powdered resin mixture in accordance with claim 1 in which the epoxy resin is the diglycidyl ether of bisphenol A.

4. A powdered resin mixture in accordance with claim 1 comprising tin octanoate or zinc acetylacetonate as a reaction accelerator.

5. A method of making a clear, substantially colorless, cured resin comprising curing at a temperature between about 140° C. and about 190° C., a powdered mixture of 5-phenyl-5-methylhexane-1,2,3,4-tetracarboxylic acid dianhydride, and an epoxy resin having an epoxy equivalent value greater than one and an epoxy equivalent weight between about 400 and about 4,000, the ratio of anhydride equivalents to epoxy equivalents in said powdered mixture being between 1.0 and about 1.5.

6. A method in accordance with claim 5 in which the epoxy equivalent weight is between about 500 and about 2,500.

7. A method in accordance with claim 5 in which the epoxy resin is the diglycidyl ether of bisphenol A.

8. A method in accordance with claim 5 in which the powdered mixture comprises zinc acetylacetonate or tin octanoate as a reaction accelerator.

9. A clear, substantially colorless, cured resin comprising the copolymer of 5-phenyl-5-methylhexane-1,2,3,4-tetracarboxylic acid dianhydride and an epoxy resin having a 1,2-epoxy equivalent value greater than one and an epoxy equivalent weight between about 400 and about 4,000 and a ratio of anhydride equivalent in said dianhydride to epoxy equivalents in said epoxy resin of between 1.0 and about 1.5.

10. A cured resin in accordance with claim 9 in which the epoxy equivalent weight is between about 500 and about 2,500.

11. A cured resin in accordance with claim 9 in which the epoxy resin is the diglycidyl ether of bisphenol A.

* * * * *